Dec. 5, 1967 J. P. SWEENEY 3,357,010

INFORMATION DISPLAY AND STORAGE MEANS EMPLOYING MULTI-APERTURE TRANSFLUXORS

Filed April 28, 1964 3 Sheets-Sheet 1

INVENTOR.
JOSEPH PATRICK SWEENEY

BY Curtis, Morris & Safford

Dec. 5, 1967 J. P. SWEENEY 3,357,010

INFORMATION DISPLAY AND STORAGE MEANS EMPLOYING MULTI-APERTURE TRANSFLUXORS

Filed April 28, 1964 3 Sheets-Sheet 2

INVENTOR.
JOSEPH PATRICK SWEENEY
BY Curtis, Morris & Safford

INVENTOR.
JOSEPH PATRICK SWEENEY
BY Curtis, Morris & Safford

United States Patent Office 3,357,010

Patented Dec. 5, 1967

3,357,010

INFORMATION DISPLAY AND STORAGE MEANS EMPLOYING MULTI-APERTURE TRANSFLUXORS

Joseph Patrick Sweeney, Harrisburg, Pa., assignor to AMP Incorporated, Harrisburg, Pa.

Filed Apr. 28, 1964, Ser. No. 363,164
3 Claims. (Cl. 340—324)

This invention relates to an information display system which incorporates saturable magnetic cores and employs magnetic core technology to accomplish information storage, control and display.

The so-called segmental or segmented display unit has come to be widely used in electronic equipment to provide visual readout from digital equipment, as for example from digital voltmeters, clocks or calculators, and to provide an electrically controlled display for information purposes. A typical unit includes a number of segments energized in different patterns or combinations to represent numerical, alphabetical or other symbols. In practice each segmental unit is provided with some means for selecting the particular number and combination of segments desired to represent a particular symbol. With incandescent segmental units the typical means for accomplishing such is a diode matrix or a resistor divider network. In one recently developed digital readout indicator having a seven segment numerical display, a diode matrix for each indicating unit was found to be comprised of some forty-nine diodes arranged in a circuit to provide selection of segments to display the numerals 1 through 9 and 0.

The foregoing is quite typical of prior art techniques and does not include the additional equipment which is necessary to achieve storage or to permit the indicating device to be utilized directly with digital inputs or with binary code patterns.

The present invention substantially eliminates the necessity to provide a relatively large and complex matrix for segmental type indicating devices, and it is an object of the invention to do so. More importantly, the present invention adds directly to all types of segmental indicating devices, a translation and storage capability which may be employed with simple binary code techniques to store permanently or temporarily a selected segmental combination. The present invention includes a saturable magnetic core and circuit to directly drive each lamp of a given segmental indicating device, employing the binary states of the core to establish device on/off characteristics. Because of this, the invention in a preferred embodiment forms a novel all solid-state segmental indicating device which includes storage of the last displayed symbol and direct electrical control of symbol selection and alteration. Through the use of magnetic core techniques, the indicating device of the invention may be rapidly switched to different combinations without the need for special matrices, switches or extensive gate networks to thus reduce cost and improve reliability. In many uses wherein the information to be displayed is already in binary form, the indicating device of the invention may be utilized directly by merely sampling an appropriate circuit which carries the binary information to be displayed. The invention thus accomplishes a translation function from binary to decimal, alphabetical or any desirable code. In addition to the foregoing, the invention features magnetic core segmental indicating device combinations capable of operation by serial, parallel or coincident current input with incandescent or other type readout being achieved via a direct drive from the cores employed with the unit.

Thus, it is a general object of the invention to provide an indicating device having a storage capability and to provide an indicating system of lower cost and greater reliability than heretofore available.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

Figure 1:
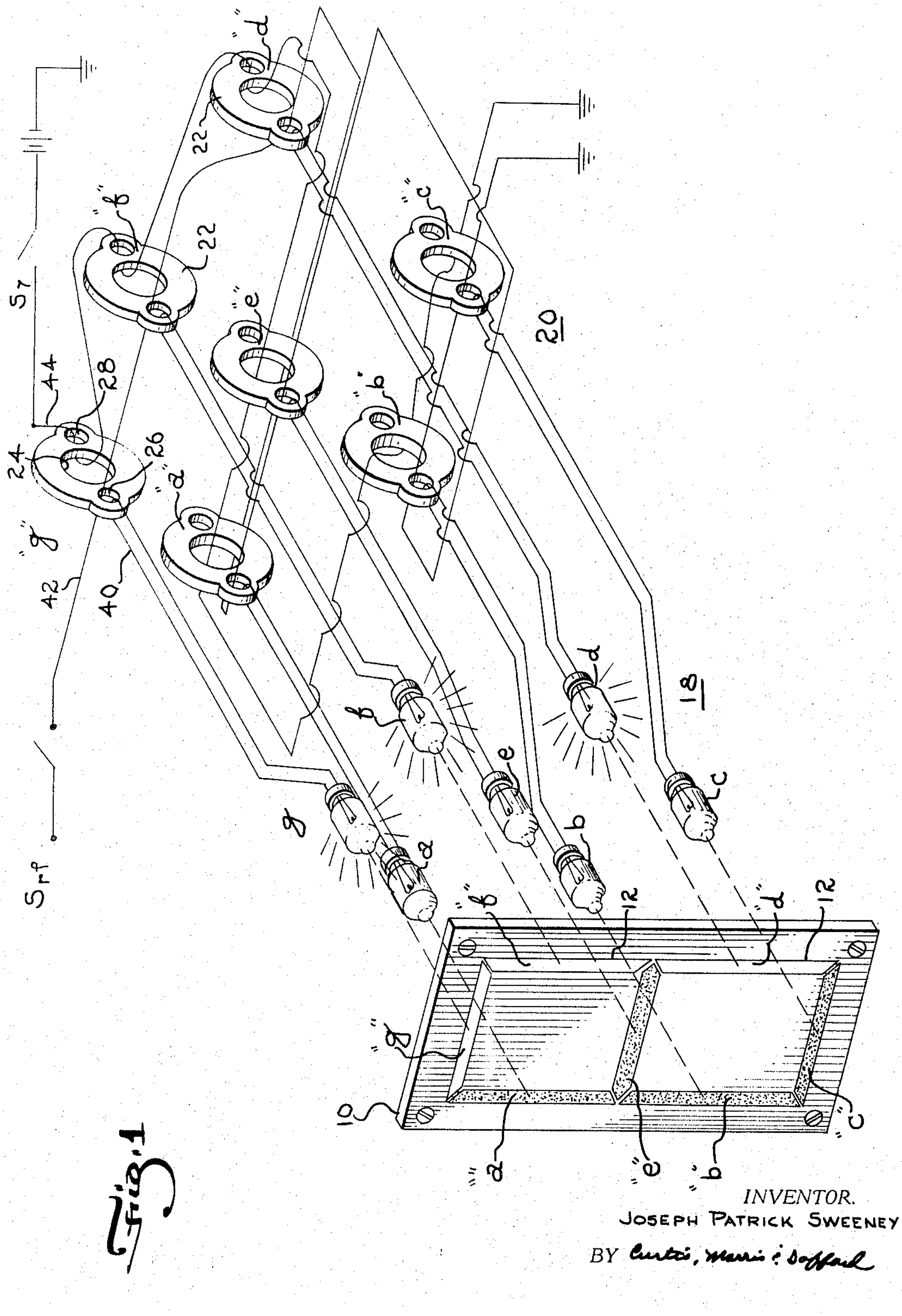
FIGURE 1 is a schematic diagram in perspective, showing a typical segmental indicating device, incandescent lamps therefor, magnetic cores and an exemplary circuit operable to drive such cores and lamps to display the number 7.

In FIGURE 1 there is a schematic diagram of one embodiment of the invention including a symbolic mask 10, a series of incandescent lamps 18 and an array of magnetic cores 20, wound individually to drive the lamps 18. Not shown in FIGURE 1, is a common housing means which serves to position and hold the lamps, cores and mask in an integral unit. Housings of the type used for this purpose are generally well-known and include further to the showing in FIGURE 1 means to channel or direct the radiation of the lamps to the particular individual segments shown as 12 in mask 10. Typically, mask 10 is of a material which is opaque to completely block the passage of light except for a number of transparent segments 12 formed therein in an arrangement capable of being combined to form numerical, alphabetical, or other symbols. The particular mask shown in FIGURE 1, is a seven segment mask which is capable of presenting the numbers 1–9 and 0, depending upon the selection of segments and associated lamps. With each segment *"a"–"g"* there is an associated lamp and as indicated in FIGURE 1, the selection of lamps *d, f, g,* provide a representation of the numeral 7. In accordance with the invention there is provided for each segment and for each lamp, a magnetic core of the multi-aperture type. The cores shown as 22 each include at least a major aperture 24 and a pair of minor apertures 26 and 28. Threading the various cores are windings of a circuit which will be more completely described hereinafter as to the function thereof to drive the lamps and to select the particular lamps to present a given symbol.

The segmental indicating device represented by FIGURE 1 may be expanded to other commercial sizes such as eleven and thirteen segment units by merely adding for each additional segment, a lamp and a core and expanding the circuit to achieve the added function. As will become apparent to those skilled in the art, other indicating devices beside those utilizing lamps can be driven through the circuit of FIGURE 1.

The type of magnetic core employed with the invention is one which is capable of being driven to at least two distinct stable states of remanent magnetization; either of which will persist indefinitely without power being maintained. Cores of this type are widely used in binary intelligence handling equipments, as for example in shift registers and logic modules. In general, the distinct states employed with the invention are as represented in FIGURES 2B and 2C, which show multi-aperture cores enlarged approximately five times with the magnetization states depicted by flux lines of closure.

Figure 2A:
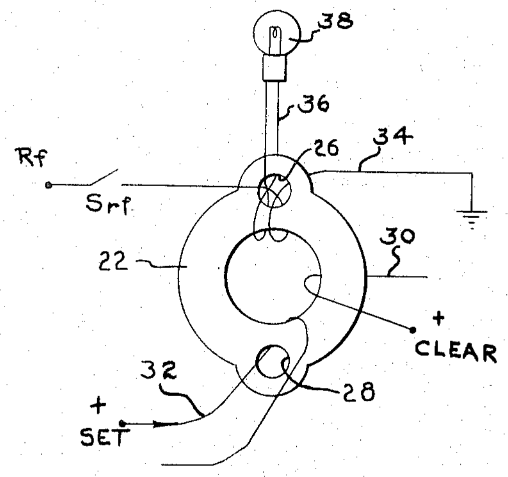
FIGURE 2A is a schematic diagram of a magnetic core and preferred circuit arrangement for incandescent readout.
Figure 2B:
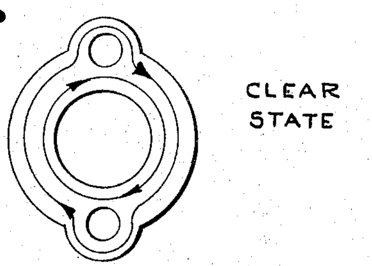
FIGURES 2B and 2C are schematic diagrams of magnetic core states.
Figure 2C:
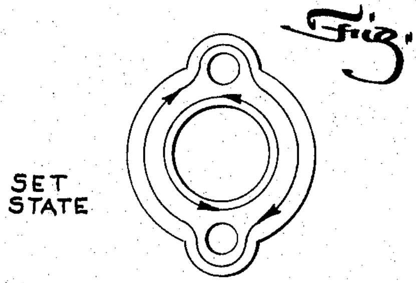

The state of FIGURE 2B is termed in the art as the "clear" or "zero" state and the state in FIGURE 2C is known as the "set" or "one" state. With respect to descriptions hereinafter to follow the "set" state is, in fact, more accurately termed a MAD-set (MAD means Multi-Aperture Device) wherein half of the material is saturated in the clockwise direction and half of the material is saturated in the counterclockwise direction to yield a net magnetization of zero. The particular states above described are achieved by windings passing through different portions of the cores which are pulsed with currents sufficient to overcome the core threshold considering the material and geometrical characteristics thereof. A typical winding utilized to achieve the state shown in FIGURE 2B is shown in FIGURE 2A by a winding 30 which is termed a "clear" winding and which links the core in a sense with respect to current to apply a clockwise MMF. The "set" winding shown as 32 in FIGURE 2A links the core down through a minor aperture and up through a major aperture by a suitable number of turns to provide the MAD-set state shown in FIGURE 2C. An input winding linking a minor aperture and a major aperture to "set" the core is preferred, since it automatically limits the degree of "set" for practical setting currents. A "set" winding alternately may be employed linking the major aperture in a manner similar to that of winding 30, but in the opposite polarity. In such use, however, the current must be limited with respect to amplitude and time of application to prevent the core from being positively saturated or fully "set."

The reason for the immediately foregoing stipulation is that it is preferred to use a type of readout which works when the core is MAD-set, but which does not work when the core is fully set. This type of readout is shown generally by the readout circuit in FIGURE 2A including an RF drive winding 34, an output loop 36 and a lamp 38, linked in figure-8 fashion to the core as indicated. This type of readout is not absolutely necessary but is preferred because it permits the intelligence or information state of the core to be altered without gating the readout drive circuit off, as is the case with most prior art devices. A detailed description of this type of readout is found in U.S. application, Serial Number 249,466, filed January 4, 1963, now Patent No. 3,185,326 in the names of J. C. Mallinson and J. P. Sweeney, but briefly stated the circuit operates to produce a substantial current flow in the output winding if the core is MAD-set or driven into the binary "one" state and to produce an insubstantial current flow in the output winding if the core is in the "clear" or binary "zero" state. As a further advantage of this type of readout a broader range of operation of magnetic core devices can be achieved.

Referring now and again to FIGURE 1 and to a description of the operation of the circuit of the invention, each of the cores in the core array 20 may be considered to be wound to function generally as described with respect to FIGURES 2A–2C; the actual winding being simplified as an alternative embodiment of the circuit of the invention. Thus with respect to the core labeled *"g,"* the output winding shown as 40 links the outer leg of the core through the minor aperture 26 only, not being wound in figure-8 fashion. The RF winding shown as 42 links the aperture 26 to the *"g"* core also not in figure-8 fashion. While single turns are shown with respect to windings 40 and 42 it is to be understood that with typical or standard commercial cores such windings will have a number of turns about the core legs in order to develop sufficient voltage to drive incandescent lamps which are commercially available. The readout winding 40 and RF winding 42 are duplicated with respect to the cores *"a"–"f."* From the discussion above given it should be appreciated that closure of the RF drive switch $S_{RF}$ will energize the various cores linked by winding 42 to produce outputs which drive the indicating lamps linked by the cores which are in the "one" state but leave the lamps of the cores in the "zero" state extinguished or substantially so to produce a segmental pattern in accordance with the setting of selected cores. The winding shown as 44 represents one of a number of control windings adapted to selectively "set" and "clear" cores *"a"–"g"* to produce a designed segmental pattern. By closure of the switch $S_7$ a battery or some pulse source connected to lead 44 will cause a current flow producing an MMF driving each of the cores through the turns of winding 44 in the manner described with respect to FIGURES 2A–C. The polarity of the turns is such as to "set" the cores identified as *"d," "f"* and *"g"* and to "clear" the cores *"a," "b," "c"* and *"e"* thus causing the lamps *"d," "f"* and *"g"* to be lighted and the remaining lamps to be, or remain, extinguished. For the other numerical representations which can be displayed by selection of different cores, lamps and segments there would be provided a winding similar to 44 but threading the cores in different patterns to cause energization of lamps appropriate to such patterns. Thus from FIGURE 1 it should be apparent how, in accordance with the invention, a seven segment indicating unit may be driven to operate to display the digits 1–9 and 0 through the addition of but seven cores and a simple drive circuit. The device may be constructed free of diodes, resistors or other components necessary in present art techniques employing a separate logic matrix to accomplish selection of the proper lamps for given number. The use of magnetic material and copper wire, only permits the control and selection part of the indicating unit to have an almost infinite life; there being in fact no parts to wear out or be used up.

Figure 3:
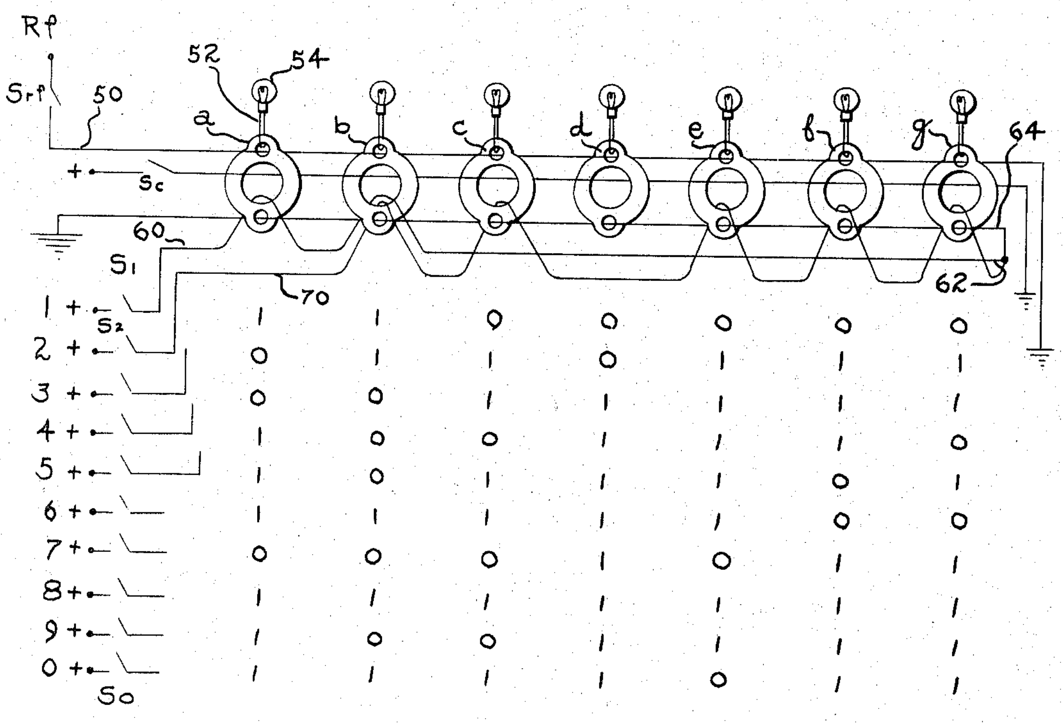
FIGURE 3 is a schematic diagram showing an alternative circuit arrangement and in conjunction therewith the binary codes necessary to achieve a display from a seven segment readout indicator of the numbers 1–9 and 0.

The particular winding scheme featured with respect to FIGURE 1 has a single winding for each possible number; e.g., the winding 44 shown with respect to the number 7. An alternative scheme of pattern wiring is shown in FIGURE 3 which further exemplifies the use of binary coding techniques to control a series of cores. The cores shown in FIGURE 3 are labeled *"a"–"g"* and may be considered as physically arranged in a suitable manner for a display device rather than in the manner actually depicted.

Each of the cores is threaded by a common winding such as 50 connected to an RF source by a switch $S_{RF}$ and each core includes a readout winding 52 driving a lamp indicated as 54. The turns for the windings 50 and 52 may be of the figure-8 type described with respect to FIGURE 2A. Also threading the cores are pattern input windings of a preferred type. Below the cores *"a"–"g"* and arranged with respect to numerals listed to the left as 1–0 and 0 are the binary values forming codes associated with the "set" and "clear" states of the cores which, in turn, control associated lamps to produce a desired pattern from the indicating unit. Thus, with respect to the presentation of numeral 1 and again referencing FIGURE 1 it will be seen that the segments *"a"* and *"b"* are to be lighted and the remaining segments *"c"–"g"* are not to be lighted. In accordance with the embodiment of FIGURE 3, the cores *"a"* and *"b"* are wired to be "set" and the cores *"c"–"g"* are wired to be "cleared" with the result that the lamps associated with cores "*a*" and "*b*" are lighted and the remaining lamps are not lighted. Referring to FIGURE 3, the binary code for accomplishing this is for cores "*a*"–"*g*," 1–1–0–0–0–0–0. As to numeral 2, the code is 0–1–1–0–1–1–1 to cause segments "*b*," "*c*," "*e*," "*f*" and "*g*" to be lighted and segments "*a*" and "*d*" not to be lighted.

The patterns for numerals 3–0 are as shown in FIGURE 3. With the invention technique there is a direct logic function performed by pattern wiring the cores.

The particular circuit shown in FIGURE 3 has a winding pattern for each numeral 1–9 and 0 which operates to "set" the selected cores through separate windings, applied through the core major aperture and a common winding applied through all minor apertures. Thus with respect to a display of numeral 1 the winding shown as 60 threads the core "*a*" and the core "*b*" by a number of turns in a sense to "set" or apply a counterclockwise MMF to the core major path. The winding 60 is terminated at a common point shown as 62 and from there follows a current return path formed by winding 64 which threads each of the minor apertures of each of the cores "*a*"–"*g*" in a sense to apply a clockwise MMF. By closing switch $S_1$ the winding 60 is energized to set cores "*a*" and "*b*" and leave the remaining cores "*c*"–"*g*" cleared. The composite MMF formed by the turns of windings 60 and 64 will, in the manner previously described, provide a MAD-set without fully setting the cores.

The lead 70 connects to switch $S_2$ for effecting a display of numeral 2 and links the cores "*b*," "*c*," "*e*," "*f*" and "*g*" by turns through the core major apertures and returns by the common lead 64 through the minor apertures of the cores. The remaining numerals 3–9 and 0 are suitably provided with windings not shown which thread the cores in the senses indicated by the binary codes associated therewith and closure of a particular switch will operate as above to cause a display of a numeral by setting a particular pattern into the cores. An added advantage of this type of circuit is that only a single winding need be threaded through the core minor apertures and therefore assembly labor is reduced since the bulk of the turns which accomplish the selection and setting of the coded patterns are through the relatively large core major apertures. The advantage of this can be appreciated from examining a typical core used for this purpose which has a major aperture of 240 mills and a minor aperture of only 20 mills and utilizes conductive pattern wire of 3.5 mills (thousandths of an inch).

The foregoing description of the circuit of FIGURE 3 assumes that the cores are initially in a "clear" or "zero" state. In practice, this may be assured by means of a winding such as 72 connected to a pulse source in a switch $S_C$.

Figure 4:
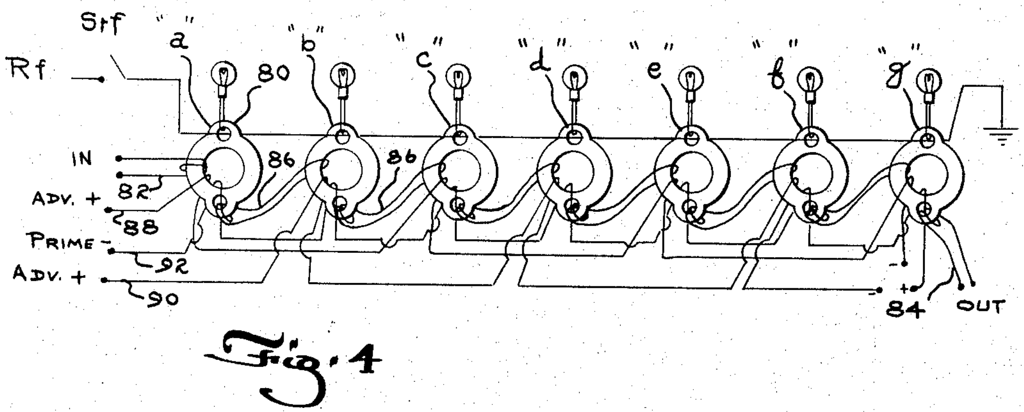
FIGURE 4 is a schematic diagram showing a further embodiment of the invention in a circuit capable of providing readout in response to serial input.

FIGURE 4 shows yet another embodiment of the invention employing seven cores 80 labeled "*a*"–"*g*" as before and each linked with an RF drive and readout circuit identical to that described with respect to FIGURE 3. The cores 80 are further linked by transfer windings including an input winding 82, an output winding 84 and coupling windings 86 linking the various cores for serial transfer. This arrangement is such that binary coded patterns may be fed into the core array and transferred therealong in serial fashion. The drive circuit shown include advance windings 88 and 90 and a prime winding 92. The advance circuit is arranged to link alternate cores with one source of pulses and the other cores with another and phased source of pulses. The prime circuit links all of the cores in series. A general description of a core array of this type is given in my U.S. Patent No. 2,995,731.

With this arrangement the binary coded patterns shown in FIGURE 3 may be transferred into the cores "*a*,"–"*g*" and stored therein to provide indication of a selected numeral at will by the closure of the RF supply switch $S_{rf}$.

If the type of figure-8 RF and readout windings shown in S.N. 249,966 above mentioned are employed, the device may be loaded with binary patterns with the RF supply left on. The use of a serial transfer indicating device may be made in conjunction with various types of control equipment wherein pulses are available to develop the particular coded pattern necessary to accomplish a desired readout, the drive being separately developed.

Figure 5:
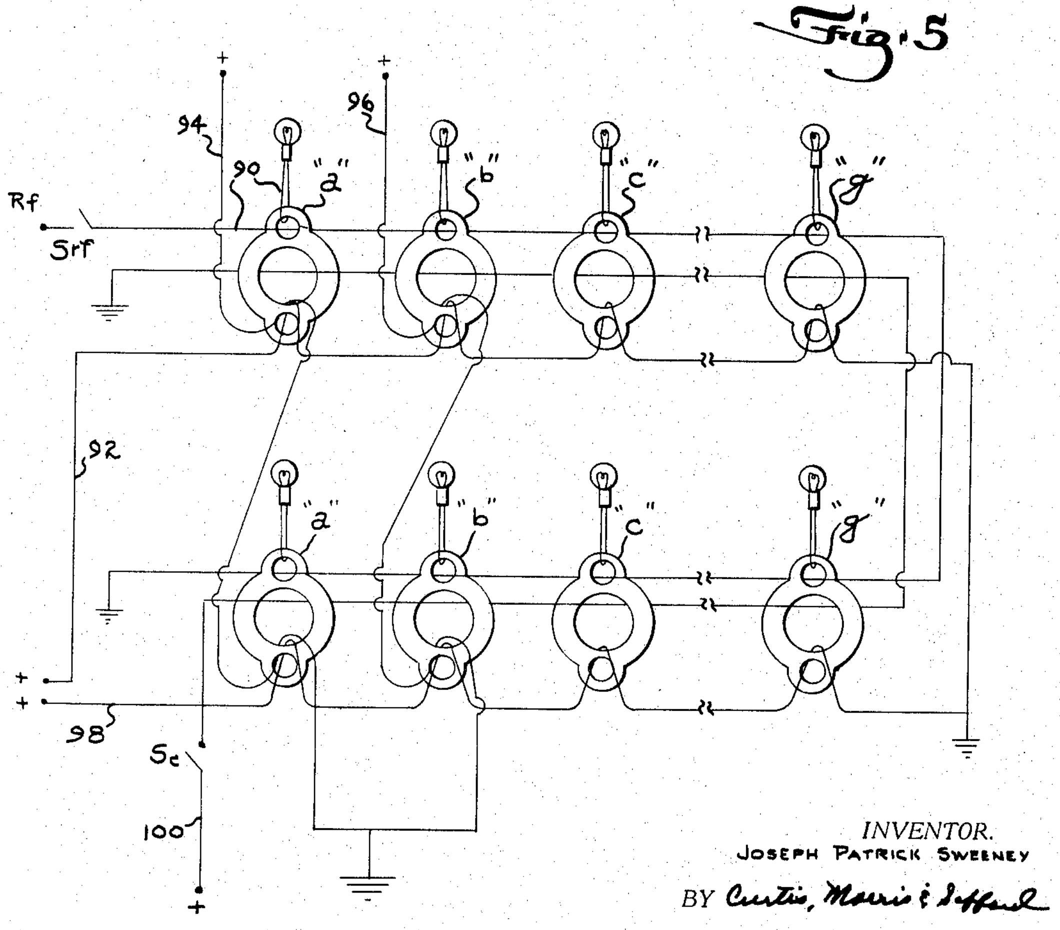
FIGURE 5 is a schematic diagram showing yet another circuit embodiment of the invention wherein readout may be obtained through the utilization of coincident current techniques.

FIGURE 5 shows a further embodiment of the circuit invention abbreviated for clarity but including two sets of cores for seven segment arrays for two segmental units. The RF drive and readout circuit shown as 90 is identical to that described above with respect to FIGURES 3 and 4. The "set" input windings are in the coincident current selection form frequently used in torroidal core memories but with additional turns to achieve the MAD-set above described. The input windings accomplish both the on-off control function and a selection function. Thus, for example, with respect to the core "*a*" of the top segmental array there is provided a first winding 92 which links each of the cores through turns about the core minor and major apertures in a sense such that a pulse applied thereto will drive the cores in a setting sense, the MMF being approximately half the set drive of the core. A further winding 94 is provided which links the "*a*" cores of top and bottom arrays in a similar sense. By simultaneously applying pulses to 92 and 94 the core "*a*" of the uppermost array will be selected and "set" and the remaining cores will not be "set." This circuit arrangement is duplicated with respect to other cores in the same manner. For example, energization of the windings of 96 and 98 will select and "set" the core "*b*" in the lower array. Energization off windings 92 and 96 will select and "set" the core "*b*" of the upper array. The cores which are not to be "set" for a given selection of cores are initially "cleared" by a common winding 100 which links all of the cores in a proper sense. In use, all cores are first "cleared" and then a desired pattern of cores is selected and "set" to provide a desired choice of segments for display.

Another arrangement not shown but similar to that of FIGURE 5 may be as taught in U.S. Application S.N. 244,608, filed December 14, 1962, by John A. Swanson now Patent No. 3,298,003. To the circuit there described would be added RF driver and readout for each core of a given row of cores. The references to "words" may represent a description of "codes" with respect to the present application. Other types of segmental displays may be served by the circuits of the invention such as a display having one symbol per lamp.

While the device of the invention has been described relative to single and distinct magnetic cores it is contemplated that a given display unit may be provided with a composite core having in an integral structure the equivalent of seven or more single cores. This may be done by providing in the composite core seven major apertures defining major paths and for each major aperture two or more minor apertures for input and readout.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. In a device for providing a visual presentation of stored intelligence, a plurality of multi-aperture magnetic cores of square loop magnetic material, each including a major aperture, a minor input aperture and a minor output aperture, a drive circuit for said cores, including a drive source to supply pulses of sufficient energy to set or clear said cores, a plurality of switches, each connected in parallel to said source and in series to a separate drive lead linking a plurality of cores through the major aperture thereof and through the minor input aperture thereof in a sense to set said several cores into a state of magnetization wherein approximately half of the flux of the core is oriented in one direction and approximately half of the flux in said core is oriented in an opposite direction relative to closed flux paths surrounding said major aperture, the said switches and associated drive leads linking different ones of said cores to form different patterns of set conditions in said plurality of cores, an output winding linking the minor output aperture of each core and connected to an indicating device and a further drive winding linking said minor output aperture to apply a drive thereto operable to energize said output winding and an indicating device continuously when a core is set but not when a core is cleared, and means to clear those of the plurality of cores not set by a given switch.

2. The device of claim 1 wherein said means for clearing cores is a lead having windings in series with each separate drive lead whereby to provide a clearing of the remainder of said plurality of cores simultaneously with the setting of said cores by a separate drive lead and winding.

3. The device of claim 1 wherein the said winding linking the minor input apertures of said cores of each pattern of cores is the same winding for all of said separate drive leads with the winding inserted in the major apertures of said cores for each pattern of cores being a different winding to form a separate drive lead for each pattern of cores.

References Cited

UNITED STATES PATENTS

| | | | |
|---|---|---|---|
| 2,920,408 | 1/1960 | McQuire | 340—336 X |
| 3,019,418 | 1/1962 | Rajchman | 340—166 |
| 3,208,052 | 9/1965 | Bennion et al. | 340—174 |

OTHER REFERENCES

Rajchman et al.: "Transfluxor Controlled E–L Display Panels," Proceedings of IRE, November 1958, pp. 1808–1824.

Morris: "The Shape and Performance of Multi-aperture Magnetic, Devices," Electronic Engineering, July 1964, pp. 440–447.

THOMAS B. HABECKER, *Acting Primary Examiner.*

NEIL C. READ, *Examiner.*

A. J. KASPER, *Assistant Examiner.*